(12) United States Patent
Kim et al.

(10) Patent No.: US 7,941,187 B2
(45) Date of Patent: May 10, 2011

(54) APPARATUS FOR USING A WIRELESS COMMUNICATION BASE STATION IN COMMON

(75) Inventors: Duk-Yong Kim, Gyeonggi-do (KR); Sang-Sig Park, Gyeonggi-do (KR); Myoung-Hoon Yang, Gyeonggi-do (KR)

(73) Assignee: KMW Inc. (KR)

( * ) Notice: Subject to any disclaimer, the term of this patent is extended or adjusted under 35 U.S.C. 154(b) by 0 days.

(21) Appl. No.: 12/281,048

(22) PCT Filed: Mar. 16, 2006

(86) PCT No.: PCT/KR2006/000969
§ 371 (c)(1),
(2), (4) Date: Nov. 21, 2008

(87) PCT Pub. No.: WO2007/100169
PCT Pub. Date: Sep. 7, 2007

(65) Prior Publication Data
US 2009/0069053 A1     Mar. 12, 2009

(30) Foreign Application Priority Data

Feb. 28, 2006 (KR) .................... 10-2006-0019691

(51) Int. Cl.
*H04M 1/00* (2006.01)
(52) U.S. Cl. .... 455/561; 455/39; 455/127.1; 455/343.1; 455/114; 455/75; 455/101; 455/524; 455/129; 455/126; 455/324; 370/347; 370/535; 370/342; 370/208; 379/406.08
(58) Field of Classification Search .................... 455/39, 455/127.1, 343.1, 1, 114, 78, 24, 63.1, 101, 455/524, 129, 313, 552.1, 73, 126, 180.1, 189.1, 324, 296, 455, 370, 379; 375/316; 370/347, 535, 342, 208, 328, 286; 379/406.08
See application file for complete search history.

(56) References Cited

U.S. PATENT DOCUMENTS

| | | | | |
|---|---|---|---|---|
| 5,148,128 A | * | 9/1992 | Mazumder | .................... 332/103 |
| 5,412,354 A | | 5/1995 | Quan | |
| 5,809,088 A | * | 9/1998 | Han | ............................ 375/344 |

(Continued)

FOREIGN PATENT DOCUMENTS

JP          01-319303 A       12/1989

(Continued)

*Primary Examiner* — Marivelisse Santiago-Cordero
*Assistant Examiner* — Joseph Arevalo
(74) *Attorney, Agent, or Firm* — Mark D. Perdue, Esq.; Kenneth (Woo) Rhim, Esq.; Storm LLP

(57) ABSTRACT

In the wireless communication base station sharing apparatus, a first signal combiner/distributor is connected to a main system duplexer through a first port, distributes a signal received through the first port to second and third ports, combines the signals received through the second and third ports according to the phases of the signals, and provides the combined signal through the first port or a fourth port. A second signal combiner/distributor is connected to a subsystem duplexer through a fifth port and the antenna through an eighth port, distributes a signal received through the fifth port to sixth and seventh ports, combines the signals received through the sixth and seventh ports according to the phases of the signals, and provides the combined signal through the fifth or eighth port. Variable filters are provided in signal paths between the first and second signal combiner/distributors.

11 Claims, 13 Drawing Sheets

U.S. PATENT DOCUMENTS

| | | | |
|---|---|---|---|
| 5,930,374 A * | 7/1999 | Werrbach et al. | 381/99 |
| 6,411,176 B1 * | 6/2002 | Atokawa et al. | 333/132 |
| 6,567,647 B1 * | 5/2003 | Epperson | 455/83 |
| 6,710,813 B1 * | 3/2004 | Grandchamp et al. | 348/487 |
| 6,748,197 B2 * | 6/2004 | Lindemann et al. | 455/82 |
| 2002/0057219 A1 * | 5/2002 | Obayashi | 342/372 |
| 2003/0054861 A1 | 3/2003 | Skarby | |
| 2004/0020511 A1 * | 2/2004 | Sandhu et al. | 134/1 |
| 2006/0133598 A1 * | 6/2006 | Pagnanelli | 379/406.08 |
| 2007/0183791 A1 * | 8/2007 | Rossetti et al. | 398/183 |

FOREIGN PATENT DOCUMENTS

| | | |
|---|---|---|
| JP | 05-145305 A | 6/1993 |
| JP | 2000-349508 A | 12/2000 |
| JP | 2003-101451 A | 4/2003 |
| KR | 19990071228 A | 9/1999 |
| KR | 20040020511 A | 3/2004 |
| KR | 1020050020928 A | 3/2005 |

* cited by examiner

APPARATUS FOR USING A WIRELESS COMMUNICATION BASE STATION IN COMMON

BACKGROUND OF THE INVENTION

1. Field of the Invention

The present invention relates generally to a wireless communication system, and in particular, to a wireless communication base station sharing apparatus for sharing an antenna and a feeder cable in deploying wireless communication systems that provide services in different frequency bands.

2. Description of the Related Art

As illustrated in FIGS. 1A, 1B and 1C, a plurality of service providers provide services through independent base stations (BSs) 10 and 12 in cellular, CDMA, PCS and GSM mobile communication systems and other wireless communication systems. The resulting redundant investment regarding installation of individual BSs and unnecessary existence of too many BSs in an adjacent area lead to signal quality degradation due to mutual interference between the BSs.

As it has occurred recently that one service provider merges other service providers and thus needs to provide services, integrating the frequency bands of the service providers. In this case, a need exists for unifying the existing system with the added systems to reduce cost. One service provider may be assigned different frequencies in different areas in overseas. He must deploy BS systems operating in different frequency bands locally.

To overcome this problem, techniques for sharing a BS have been developed. One of the techniques is to share a BS antenna and a feeder cable by use of a new quadroplexer 132 covering the frequency bands of an existing BS system, for example, a system 10 (system A) and a sub-BS system, for example, a system 12 (system B), as illustrated in FIG. 1C.

This technique requires fabrication of such a quadroplexer as allows two systems to share an antenna and a feeder cable. Moreover, in case of different frequency bands assigned to a service provider in different areas, many quadroplexers must be fabricated. If the frequency band of a subsystem is changed while the subsystem is operated, sharing an antenna and a feeder cable with a main system, a new quadroplexer is needed. If a plurality of subsystems are added, a plurality of new quadroplexers are to be fabricated.

As described above, since a new quadroplexer must be fabricated to share an antenna and a feeder cable between an existing main system and an added subsystem in the conventional technology. Therefore, fabrication cost and management cost are increased.

SUMMARY OF THE INVENTION

Accordingly, an object of the present invention is to provide a wireless communication BS sharing apparatus for allowing an existing main BS system and an added sub-BS system to easily share a BS antenna and a feeder cable irrespective of the frequency band of the sub-BS system in deploying the sub-BS system in addition to the existing main BS system.

Another object of the present invention is to provide a wireless communication BS sharing apparatus for allowing an existing main BS system and an added sub-BS system to easily share a BS antenna and a feeder cable without using additional equipment even though the frequency bands of the main BS system and the sub-BS system are changed in deploying the sub-BS system in addition to the existing main BS system.

A further object of the present invention is to provide a wireless communication BS sharing apparatus for, despite a plurality of added sub-BS systems, allowing a main BS system and the sub-BS systems to easily share an antenna and a feeder cable.

Still another object of the present invention is to provide a wireless communication BS sharing apparatus for allowing different operation systems to easily share a given frequency band separately.

The above objects are achieved by providing a wireless communication base station sharing apparatus for sharing one antenna between a main system and a subsystem. In the wireless communication base station sharing apparatus, a first signal combiner/distributor is connected to a transmission/reception signal line of a main system duplexer through a first port, distributes a signal received through the first port to second and third ports, combines the signals received through the second and third ports according to the phases of the signals, and provides the combined signal through the first port or a fourth port. A second signal combiner/distributor is connected to a transmission/reception signal line of a subsystem duplexer through a fifth port and the antenna through an eighth port, distributes a signal received through the fifth port to sixth and seventh ports, combines the signals received through the sixth and seventh ports according to the phases of the signals, and provides the combined signal through the fifth or eighth port. A first variable filter is provided in a signal path between the second port of the first signal combiner/distributor and the sixth port of the second signal combiner/distributor. A first variable filter is provided in a signal path between the third port of the first signal combiner/distributor and the seventh port of the second signal combiner/distributor.

DETAILED DESCRIPTION OF EXEMPLARY EMBODIMENTS

Preferred embodiments of the present invention will be described herein below with reference to the accompanying drawings. In the following description, well-known functions or constructions are not described in detail since they would obscure the invention in unnecessary detail.

Figure 1A:
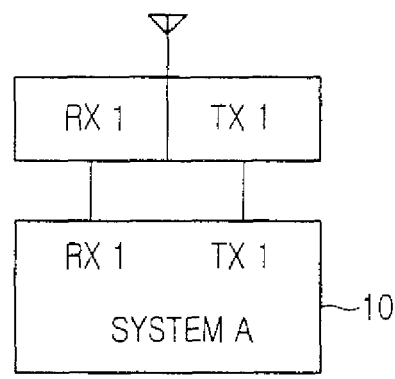
FIGS. 1A, 1B and 1C are block diagrams illustrating a conventional antenna sharing method.
Figure 1B:
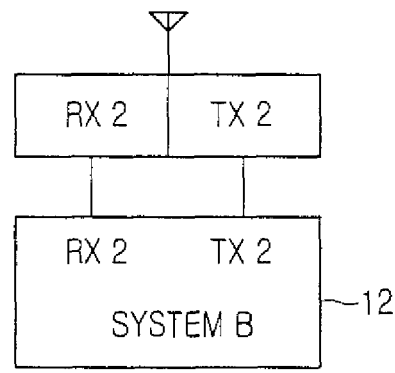
Figure 1C:
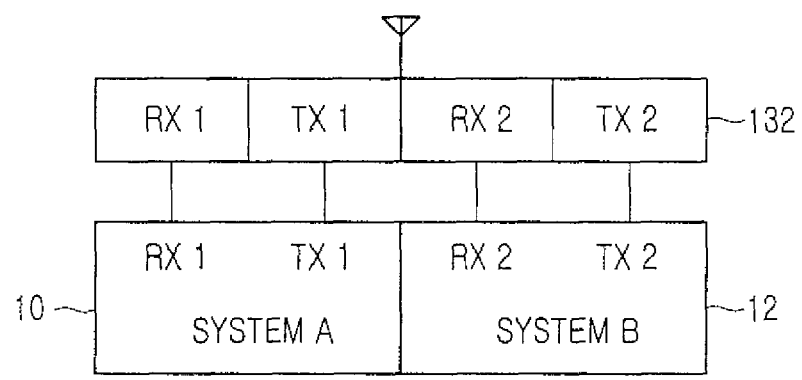
Figure 2:
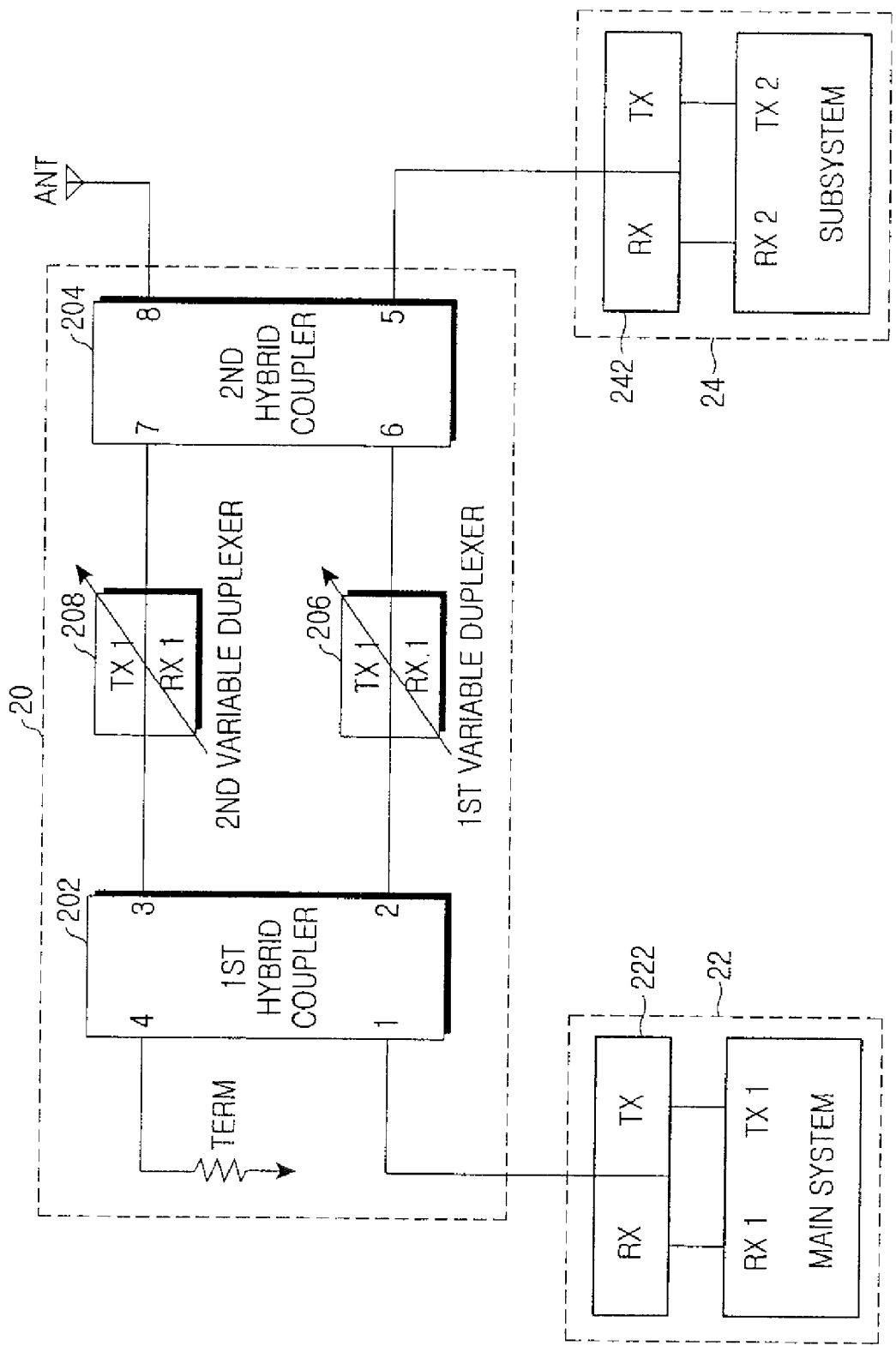
FIG. 2 is a block diagram of a wireless communication BS sharing apparatus according to an embodiment of the present invention.

FIG. 2 is a block diagram of a wireless communication BS sharing apparatus according to an embodiment of the present invention. Referring to FIG. 2, a wireless communication BS sharing apparatus 20 is so configured as to share an antenna between a main system 22 with a third duplexer 222 and a subsystem 24 with a fourth duplexer 242. This BS sharing apparatus 20 includes the main system with the third duplexer, the subsystem with the fourth duplexer, a first hybrid coupler 202 for distributing a transmission signal received from the main system 22 through a first port and outputting the distributed transmission signals with different phases, a first variable duplexer 206 connected to a second port of the first hybrid coupler 202, for filtering transmission and reception signals Rx1 and Rx1 of the main system 22, a second variable duplexer 208 connected to a third port of the first hybrid coupler 202, for filtering the transmission and reception signals Tx1 and Rx1 of the main system 22, and a second hybrid coupler 204 with a fifth port connected to the subsystem, for receiving signals from the first and second variable duplexers 206 and 208 through sixth and seventh ports and combining the signals.

The antenna is connected to an eighth port of the second hybrid coupler 204.

The first and second variable duplexers 206 and 208 include filters for passing only the transmission and reception frequency bands of the main system 22.

If the main system 22 is exchanged with the subsystem 24 in position, the first and second variable duplexers 206 and 208 may include filters for passing only the transmission and reception frequency bands of the subsystem 24. The third and fourth duplexers 222 and 242 are full-band duplexers.

Figure 3:
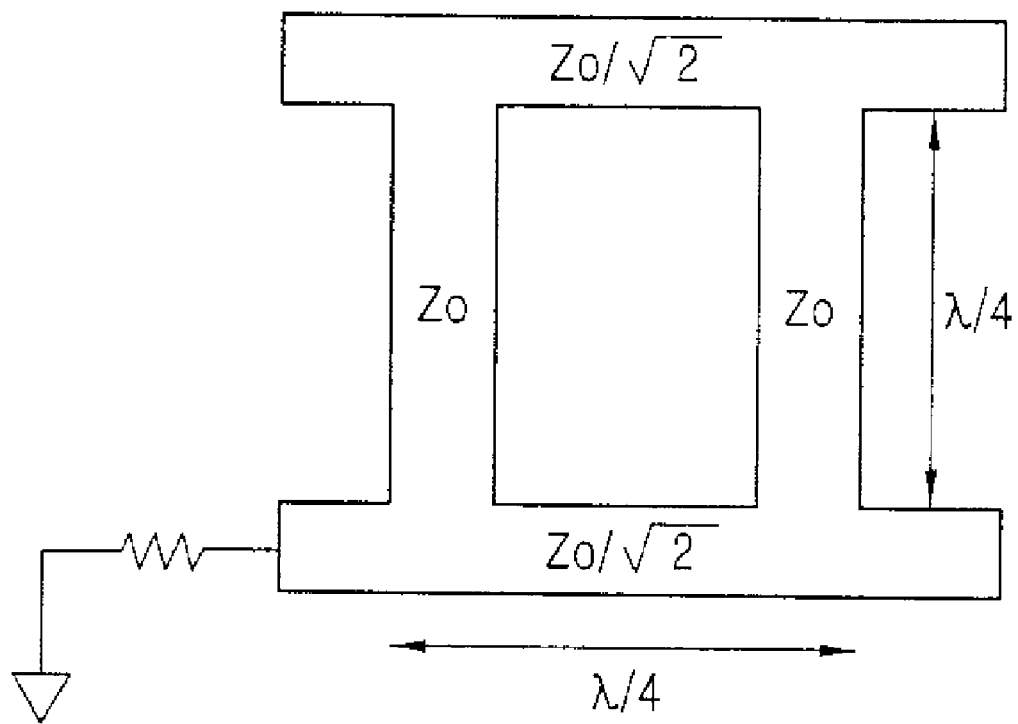
FIG. 3 is a view illustrating the operation of a hybrid coupler illustrated in FIG. 2.

With reference to FIG. 3, the operation of the hybrid couplers will be described. The hybrid couplers characteristically function to partially extract specific signal power and to distribute one signal power into two or more particular signal powers. The latter function will be described in the present invention. A signal received through the first port is output through the second and third ports, its power being divided into two halves. The signal is not output through the fourth port. There is a 90-degree phase difference between the output signals. In the opposite case, if signals with a 90-degree phase difference are received through the second and third ports, they are combined and output.

To be more specific, if a signal received through the second port has a phase of 90 degrees and a signal received through the third port has a phase of 180 degrees, the two signals are combined and output through the first port, not through the fourth port.

If the signal received through the second port has a phase of 180 degrees and the signal received through the third port has a phase of 90 degrees, the two signals are combined and output through the fourth port, not through the first port. Such parts with the signal power distributing/combining function are a hybrid ring, a branch-line directional coupler, a 3-dB directional coupler, and a magic T.

<Transmission in Main System>

The first hybrid coupler 202 receives through the first port the transmission signal TX1 from the main system 22 which has passed the third duplexer 222 and distributes the received signal to the second and third ports, its phase being rotated by 90 degrees and 180 degrees, respectively for the second and third ports. Thus, the distributed signals have a phase difference of 90 degrees. The signals from the second and third ports pass through the first and second variable duplexers 206 and 208 that pass only the transmission signal Tx1 of the main system 22 and are input to the sixth and seventh ports. The second hybrid coupler combines the signals received through the sixth and seventh ports and outputs the combined signal through the eighth port. This signal from the eighth port is radiated through the antenna.

<Reception in Main System>

The second hybrid coupler 204 distributes a signal received from the antenna through the eighth port to the sixth and seventh ports, the phase of the signal being rotated by 90 degrees and 180 degrees for the sixth and seventh ports, respectively. The first hybrid coupler 202 receives through the second and third ports the signals from the sixth and seventh ports which have passed through the first and second variable duplexers 206 and 208, combines the signals, and outputs the combined signal through the first port. The signal from the first port is received in the main system 22 through the third duplexer 222.

<Transmission in Subsystem>

A transmission signal TX2 from the subsystem 24 passes through the fourth duplexer 242 and is received at the second hybrid coupler 204 through the fifth port. The received signal is distributed to the sixth and seventh ports, its phase being rotated by 90 degrees and 180 degrees, respectively for the sixth and seventh ports. Thus, the distributed signals have a phase difference of 90 degrees. The signals from the sixth and seventh ports are fully reflected from the first and second variable duplexers 206 and 208 and fed back to the sixth and seventh ports. The feedback signals are combined and output through the eighth port. This signal from the eighth port is radiated through the antenna.

<Reception in Subsystem>

The second hybrid coupler 204 distributes a signal received from the antenna through the eighth port to the sixth and seventh ports, the phase of the signal being rotated by 180 degrees and 900 degrees for the sixth and seventh ports, respectively. The signals from the sixth and seventh ports are fully reflected from the first and second variable duplexers 206 and 208 and fed back to the sixth and seventh ports. The feedback signals are combined and output through the fifth port. This signal from the fifth port is transferred to a receiver of the subsystem 24 through the fourth duplexer 242.

Meanwhile, no reflection occurs theoretically during outputting the transmission signal Tx1 from the main system 22 through the first hybrid coupler 202. In practice, however, some of the transmission signal Tx1 is output through the fourth port, although it is slight. To prevent this problem, a load resistor TERM is provided at the fourth port, for isolation.

The reason for using the first and second variable duplexers 206 and 208 instead of fixed duplexers in the above configuration is to adapt to both cases where the total transmission and reception frequency band of a BS system is dedicated to the main system or separated to the main system and the subsystem.

For example, in the case where the service provider of a BS system provides a service to subscribers by operation system A, if operation system B has been developed to provide an enhanced service but an additional frequency band for operation system B cannot be secured, the service provider has to run operation system B with the existing limited frequency band.

Then, if some subscribers want to continuously receive the service based on operation system A due to cost or for other reasons and others want to receive the enhanced service based on operation system B, the service provider must change frequency allocation adaptively according to the numbers of subscribers regarding operation systems A and B, running the two operation systems within the limited frequency in order to satisfy the different demands of the subscribers.

Figure 12A:
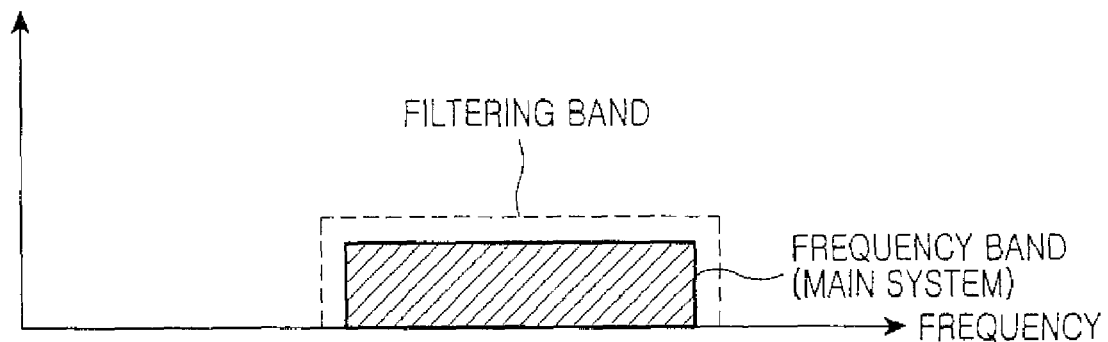
FIGS. 12A and 12B illustrate a change in frequency band when a subsystem is added by dividing the frequency band.
Figure 12B:
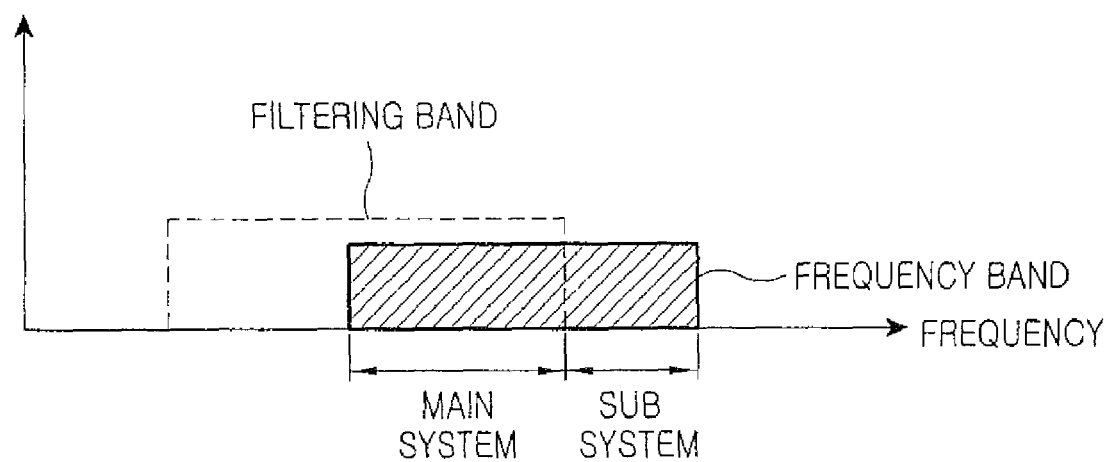

FIGS. 12A and 12B illustrate a change in frequency band when a subsystem is added by dividing a frequency band. For example, the frequency band is a transmission frequency band. As illustrated in FIG. 12A, the first and second variable duplexers 206 and 208 are band-shift filters for appropriately shifting a filtering band according to an external control signal. When only the main system 22 is provided to the BS sharing apparatus, the first and second variable duplexers 206 and 208 can be set to filter a service frequency band allocated to a corresponding service provider.

If the service provider adds the subsystem 24 and wants to provide a service through the main system 22 and the subsystem 24 by dividing the service frequency band, the first and second variable duplexers 206 and 208 shift the filtering band according to the external control signal such that it does not include a bandwidth allocated to the subsystem, as illustrated in FIG. 12B.

The shift of the filtering band by use of the first and second variable duplexers 206 and 208, not frequency band-fixed duplexers, enables addition of a subsystem to a main system through frequency band division.

A frequency band-variable filter that can change a frequency band is disclosed in Korean Patent Application No. 2004-46103 filed by the present applicant.

Figure 4:
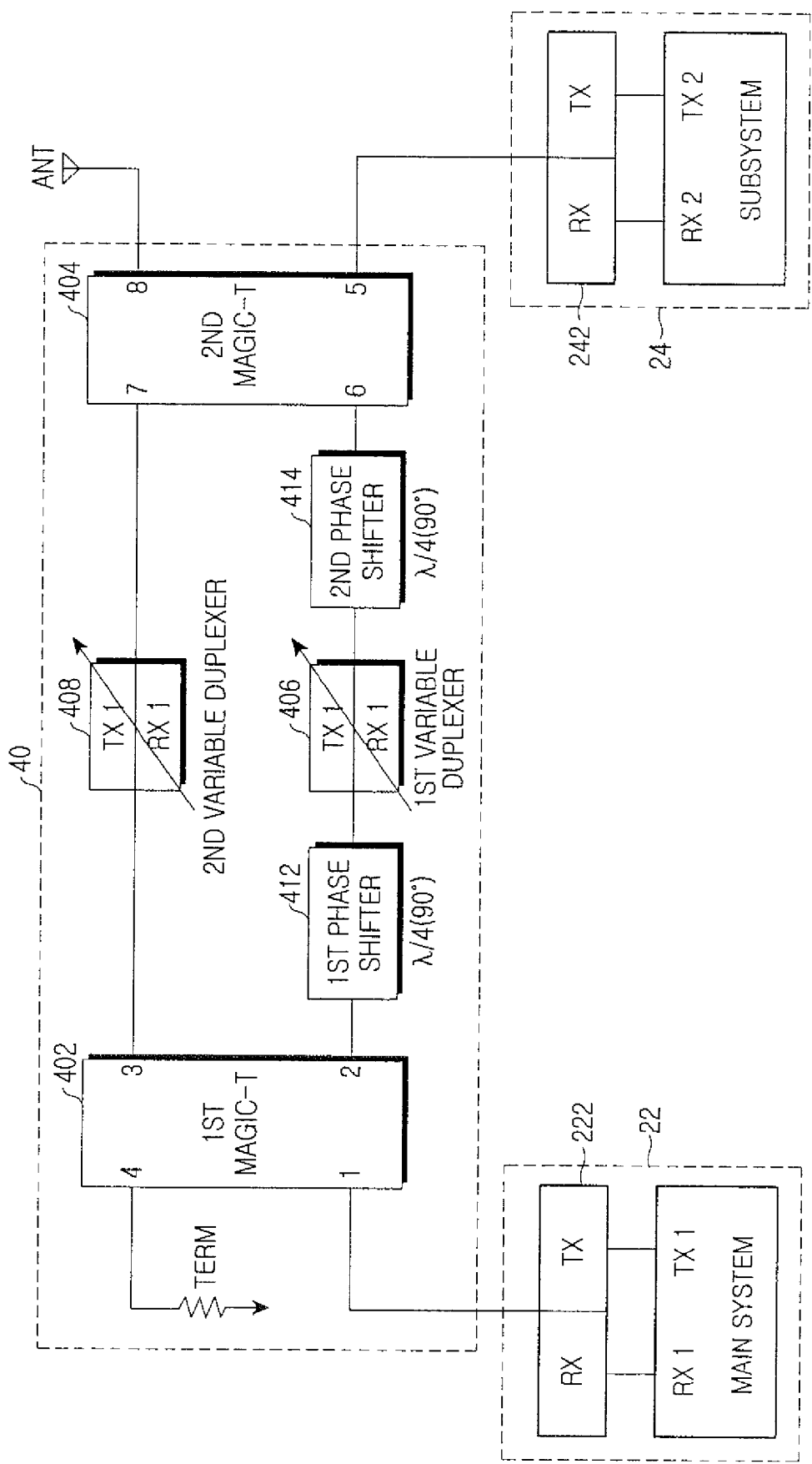
FIG. 4 is a block diagram of a wireless communication BS sharing apparatus according to another embodiment of the present invention.

FIG. 4 is a block diagram of a wireless communication BS sharing apparatus according to another embodiment of the present invention. Referring to FIG. 4, a wireless communication BS sharing apparatus 40 includes the main system with the third duplexer, the subsystem with the fourth duplexer, a first magic T 402 for distributing a transmission signal received from the third duplexer 222 of the main system 22 through a first port and outputting the distributed transmission signals with different phases, a first phase rotator 412 for receiving a signal from a second port of the first magic T 402 and rotating the phase of the received signal, a first variable duplexer 406 for filtering the signal received from the first phase rotator 412, a second phase rotator 414 for rotating the signal received from the first variable duplexer 406, a second variable duplexer 408 for filtering a signal received from a third port of the first magic T 402, and a second magic T 404 having a fifth port connected to the fourth duplexer 242 of the subsystem 24, for receiving the signals from the second phase rotator 414 and the second variable duplexer 408 through sixth and seventh ports, respectively and combining the signals.

An antenna is connected to an eighth port of the second magic T 404. The first and second variable duplexers 406 and 408 are so configured as to pass only the transmission and reception frequency bands of the main system 22. If the main system 22 is exchanged with the subsystem 24 in position, the first and second variable duplexers 406 and 408 may include filters for passing only the transmission and reception frequency bands of the subsystem 24. The third and fourth duplexers 222 and 242 are full-band duplexers.

Figure 5:
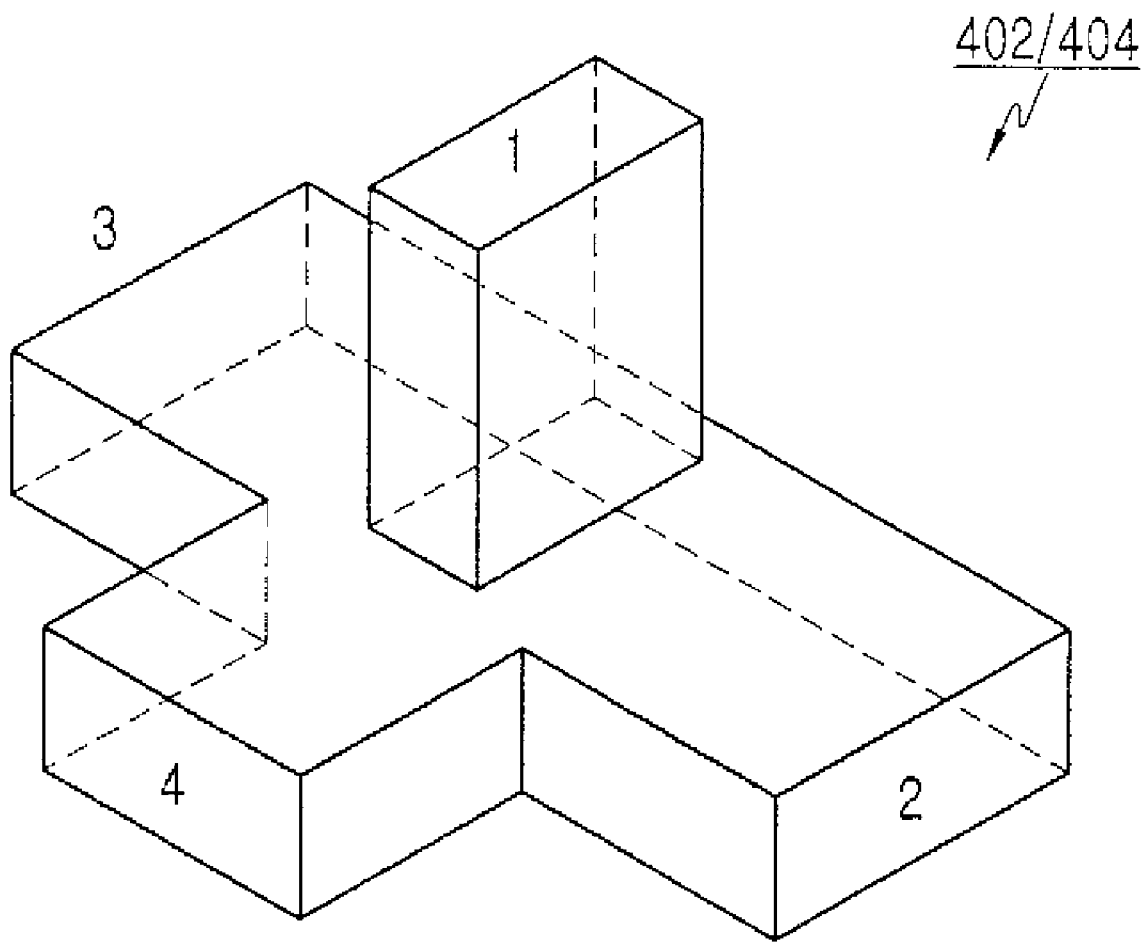
FIG. 5 is a view illustrating the operation of a magic T illustrated in FIG. 4.

With reference to FIG. 5, the basic operation of the magic Ts will be described. A signal received through the first port is distributed to the second and third ports with a phase difference of 180 degrees. On the other hand, a signal received through the fourth port is distributed to the second and third ports, with the same phase.

If signals with a phase difference of 180 degrees in the same frequency are received through the second and third ports, they are combined and output through the first port. If the same-phase signals are received through the second and third ports, they are combined and output through the fourth port.

<Transmission in Main System>

The transmission signal TX1 from the main system 22 passes through the third duplexer 222 and is input to the first port of the first magic T 402. The first magic T 402 distributes the received signal to the second and third ports, with a phase difference of 180 degrees. The signal from the third port passes through the second variable duplexer 408 and is input to the seventh port of the second magic T 404. The phase of the signal from the second port is rotated by 90 degrees in the first phase rotator 412. After passing through the first variable duplexer 406, the signal from the first phase rotator 412 is phase-rotated by 90 degrees in the second phase rotator 414 and then output to the sixth port of the second magic T 404. Hence, the signals received in the second magic T 404 through the sixth and seventh ports have the same phase. The second magic T 404 combines these signals and outputs the combined signal through the eighth port. The signal from the eighth port is radiated through the antenna.

<Reception in Main System>

The second magic T 404 receives a signal from the antenna through the eighth port and distributes the signal to the sixth and seventh ports, with the same phase. The signal from the seventh port is provided to the third port of the first magic T 402 through the second variable duplexer 408. The signal from the sixth port of the second magic T 404 is phase-rotated by 90 degrees in the second phase rotator 414, passes through the first variable duplexer 406, phase-rotated again by 90 degrees in the first phase rotator 412, and then provided to the second port of the first magic T 402. Thus, the first magic T 402 receives the signals with a phase difference of 180 degrees through the second and third ports, combines them, and outputs the combined signal through the first port. The signal from the first port is provided to a receiver of the main system 22 through the third duplexer 222.

<Transmission in Subsystem>

The transmission signal TX2 from the subsystem 24 passes through the fourth duplexer 242 and is provided to the fifth port of the second magic T 404. The second magic T 404 distributes the received signal to the sixth and seventh ports, with a phase difference of 180 degrees. The signal from the seventh port is fully reflected from the second duplexer 208 and fed back to the seventh port. While the signal from the sixth port is phase-rotated by 90 degrees in the second phase rotator 414, it is also fully reflected from the first variable duplexer 406, again phase-rotated by 90 degrees in the second phase rotator 414, and fed back to the sixth port. Thus, the second magic T 404 receives the signals with the same phase through the sixth and seventh ports, combines them, and outputs the combined signal through the eighth port. This signal from the eighth port is radiated through the antenna.

<Reception in Subsystem>

The second magic T 404 receives a signal from the antenna through the eighth port and distributes the received signal to the sixth and seventh ports, with the same phase.

The signal from the seventh port is fully reflected from the second duplexer 208 and fed back to the seventh port. While the signal from the sixth port is phase-rotated by 90 degrees in the second phase rotator 414, it is also fully reflected from the first variable duplexer 406, again phase-rotated by 90 degrees in the second phase rotator 414, and fed back to the sixth port.

Thus, the second magic T 404 receives the signals with a phase difference of 180 degrees through the sixth and seventh ports, combines them, and outputs the combined signal through the fifth port.

This signal from the fifth port is provided to the receiver of the subsystem 24 through the fourth duplexer 242.

Meanwhile, no reflection occurs theoretically during outputting the transmission signal Tx1 from the main system 22 through the first magic T 402. In practice, however, some of the transmission signal Tx1 is output through the fourth port, although it is slight. To prevent this problem, the load resistor TERM is provided at the fourth port, for isolation.

Similarly in the above configuration, the shift of the filtering band by use of the first and second variable duplexers 206 and 208, not frequency band-fixed duplexers, enables addition of a subsystem to a main system through frequency band division.

Figure 6:
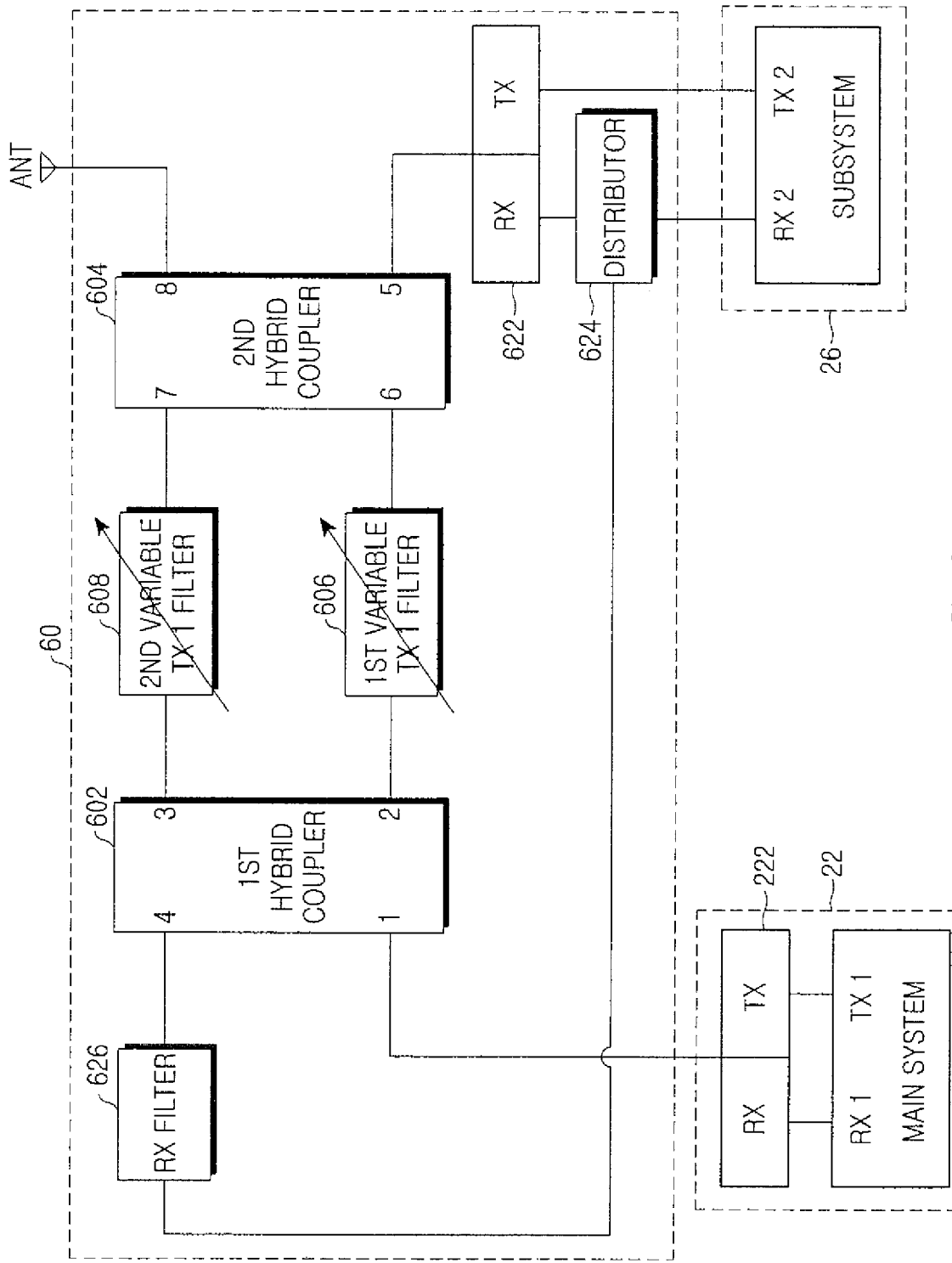
FIG. 6 is a block diagram of a wireless communication BS sharing apparatus according to a third embodiment of the present invention.

FIG. 6 is a block diagram of a wireless communication BS sharing apparatus according to a third embodiment of the present invention. Referring to FIG. 6, a wireless communication BS sharing apparatus 60 is so configured as to share an antenna between the main system 22 with the third duplexer 222 and a subsystem 26. This BS sharing apparatus 60 includes the main system with the third duplexer, the subsystem, a first hybrid coupler 602 for distributing a transmission signal received from the third duplexer 222 through a first port and a signal received from the antenna through a fourth port and outputting the distributed signals with different phases, a first variable band-pass filter 606 for filtering a signal received from a second port of the first hybrid coupler 602, a second variable band-pass filter 608 for filtering a signal received from a third port of the first hybrid coupler 602, a second hybrid coupler 604 for receiving signals from the first and second variable band-pass filters 606 and 608 through sixth and seventh ports and combining the signals, a fourth duplexer 622 connected to a fifth port of the second hybrid coupler 604 and the subsystem 26, a distributor 624 connected between a receiver Rx of the fourth duplexer 622 and the subsystem 26, for distributing a signal received from the receiver Rx of the fourth duplexer 622, and a reception filter 626 for filtering a distributed signal received from the distributor 624 and applying the filtered signal to the fourth port of the first hybrid coupler 602.

The antenna is connected to an eighth port of the second hybrid coupler 604. The receivers Rx of the third and fourth duplexers 222 and 622, and the reception filter 626 can be implemented by filters that pass both reception frequencies of the main system 22 and the subsystem 26, or full-band reception filters for passing the reception frequency band of the main system 22 and the subsystem 26 in a particular band (e.g. PCS band). The first and second variable band-pass filters 606 and 608 are so configured as to pass only the transmission frequency band of the main system 22.

If the main system 22 is exchanged with the subsystem 26 in position, the first and second variable band-pass filters 606 and 608 may include filters for passing only the transmission frequency band of the subsystem 26. The fourth duplexer 622 may not be provided if it already exists in the subsystem 26. Needless to say, the subsystem 26 must have the distributor 624 in this case.

The operations of the wireless communication BS sharing apparatus will be described below.

<Transmission in Main System>

The first hybrid coupler 602 receives through the first port the transmission signal TX1 from the main system 22 which has passed the third duplexer 222 and distributes the received signal to the second and third ports, its phase being rotated by 90 degrees and 180 degrees, respectively for the second and third ports. Thus, the distributed signals have a phase difference of 90 degrees. The signals from the second and third ports pass through the first and second variable band-pass filters 606 and 608 that pass only the transmission signal Tx1 of the main system 22 and are provided to the sixth and seventh ports of the second hybrid coupler 604. The second hybrid coupler 604 combines the received signals and outputs the combined signal through the eighth port. This signal from the eighth port is radiated through the antenna.

<Reception in Main System>

The second hybrid coupler 604 distributes a signal received from the antenna through the eighth port to the sixth and seventh ports, the phase of the signal being rotated by 180 degrees and 90 degrees for the sixth and seventh ports, respectively. The signals from the sixth and seventh ports are fully reflected from the first and second variable band-pass filters 606 and 608 and fed back to the sixth and seventh ports. The feedback signals are combined and output through the fifth port. The distributor 624 receives the signal from the fifth port through the fourth duplexer 622 and distributes the received signal. One of the distributed signals is provided to the subsystem 26 and the other is provided to the fourth port of the first hybrid coupler 602 through the reception filter 626. The first hybrid coupler 602 distributes the received signal to the second and third ports with a phase difference of 90 degrees. The signals from the second and third ports are fully reflected from the first and second variable band-pass filters 606 and 608 and fed back to the second and third ports. These feedback signals are combined and output through the first port. The signal from the first port is received in the main system 22 through the third duplexer 222.

<Transmission in Subsystem>

A transmission signal TX2 from the subsystem 26 passes through the fourth duplexer 622 and is provided to the second hybrid coupler 604 through the fifth port. The second hybrid coupler 604 distributes the received signal to the sixth and seventh ports, its phase being rotated by 180 degrees and 90 degrees, respectively for the sixth and seventh ports. Thus, the distributed signals have a phase difference of 90 degrees. The signals from the sixth and seventh ports are fully reflected from the first and second variable band-pass filters 606 and 608 and fed back to the sixth and seventh ports. The feedback signals are combined and output through the eighth port. The signal from the eighth filter is radiated through the antenna.

<Reception in Subsystem>

A signal received through the antenna is provided to the eight port of the second hybrid coupler 608 and distributed to the sixth and seventh ports, its phase being rotated by 180 degrees and 90 degrees, respectively for the sixth and seventh ports. Thus, the distributed signals have a phase difference of 90 degrees. The signals from the sixth and seventh ports are fully reflected from the first and second variable band-pass filters 606 and 608 and fed back to the sixth and seventh ports. The feedback signals are combined and output through the fifth port. This signal from the fifth port passes through the fourth duplexer 622 and is provided to the receiver of the subsystem 26 through the distributor 624.

Figure 7:
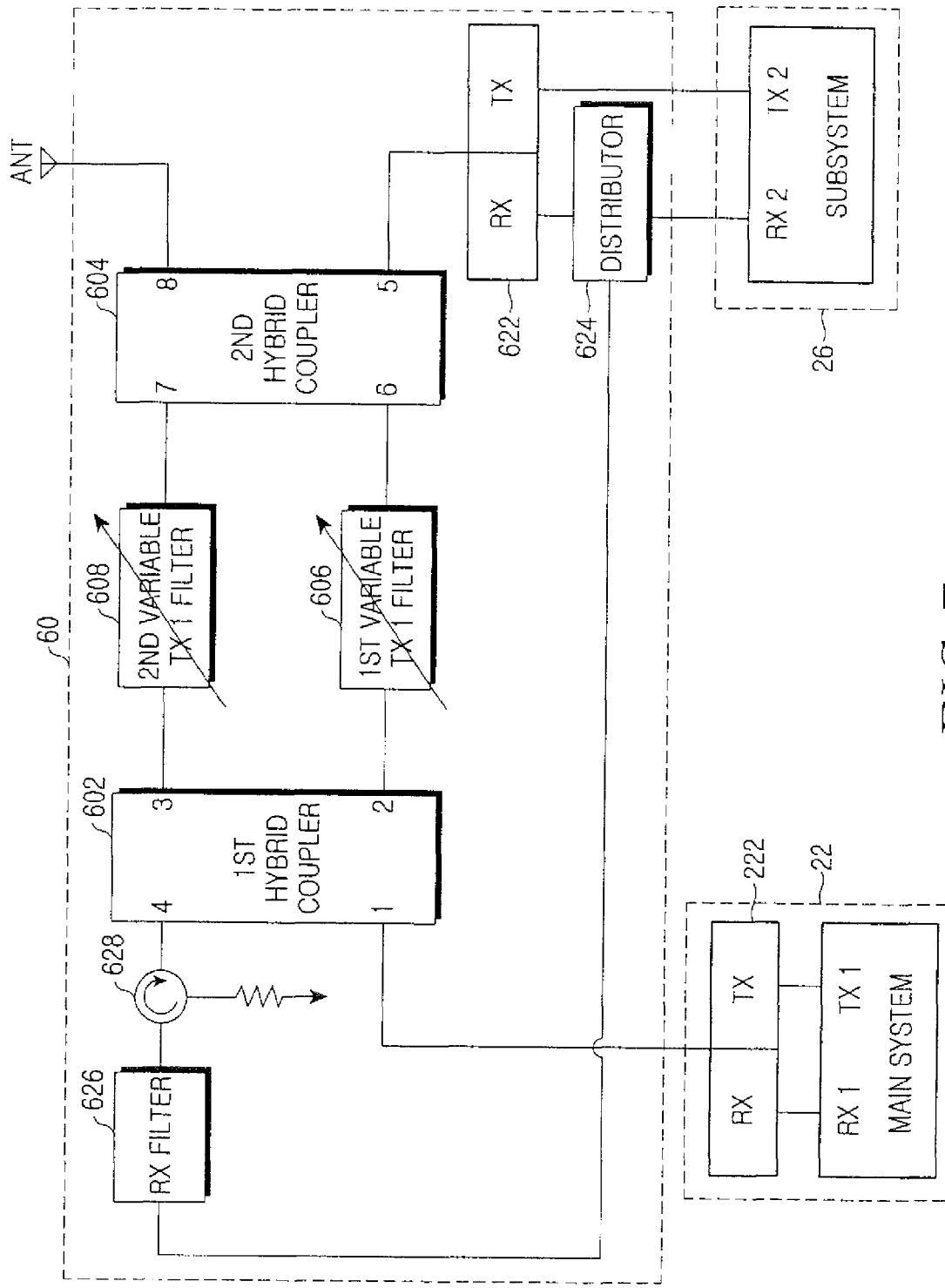
FIG. 7 is a block diagram of the wireless communication BS sharing apparatus illustrated in FIG. 6 to which a circulator is added.

Meanwhile, no reflection occurs theoretically during outputting the transmission signal Tx1 from the main system 22 through the first hybrid coupler 602. In practice, however, some of the transmission signal Tx1 is output through the fourth port, although it is slight. To prevent this problem, a circulator 628 can be further provided between the reception filter 626 and the fourth port of the first hybrid coupler 602, for isolation, as illustrated in FIG. 7.

The reason for using the first and second variable duplexers 606 and 608 instead of fixed duplexers in the above configuration is to adapt to both cases where the total transmission and reception frequency band of a BS system is dedicated to the main system or separated to the main system and the subsystem.

As illustrated in FIG. 12A, the first and second variable duplexers 606 and 608 are band-shift filters for appropriately shifting a filtering band according to an external control signal. When only the main system 22 is provided to the BS sharing apparatus, the first and second variable duplexers 606 and 608 can be set to filter a service frequency band allocated to a corresponding service provider. If the service provider adds the subsystem 26 and wants to provide a service through the main system 22 and the subsystem 26 by dividing the service frequency band, the first and second variable duplexers 206 and 208 shift the filtering band according to the external control signal such that it does not include a bandwidth allocated to the subsystem 26, as illustrated in FIG. 12B.

Figure 8:
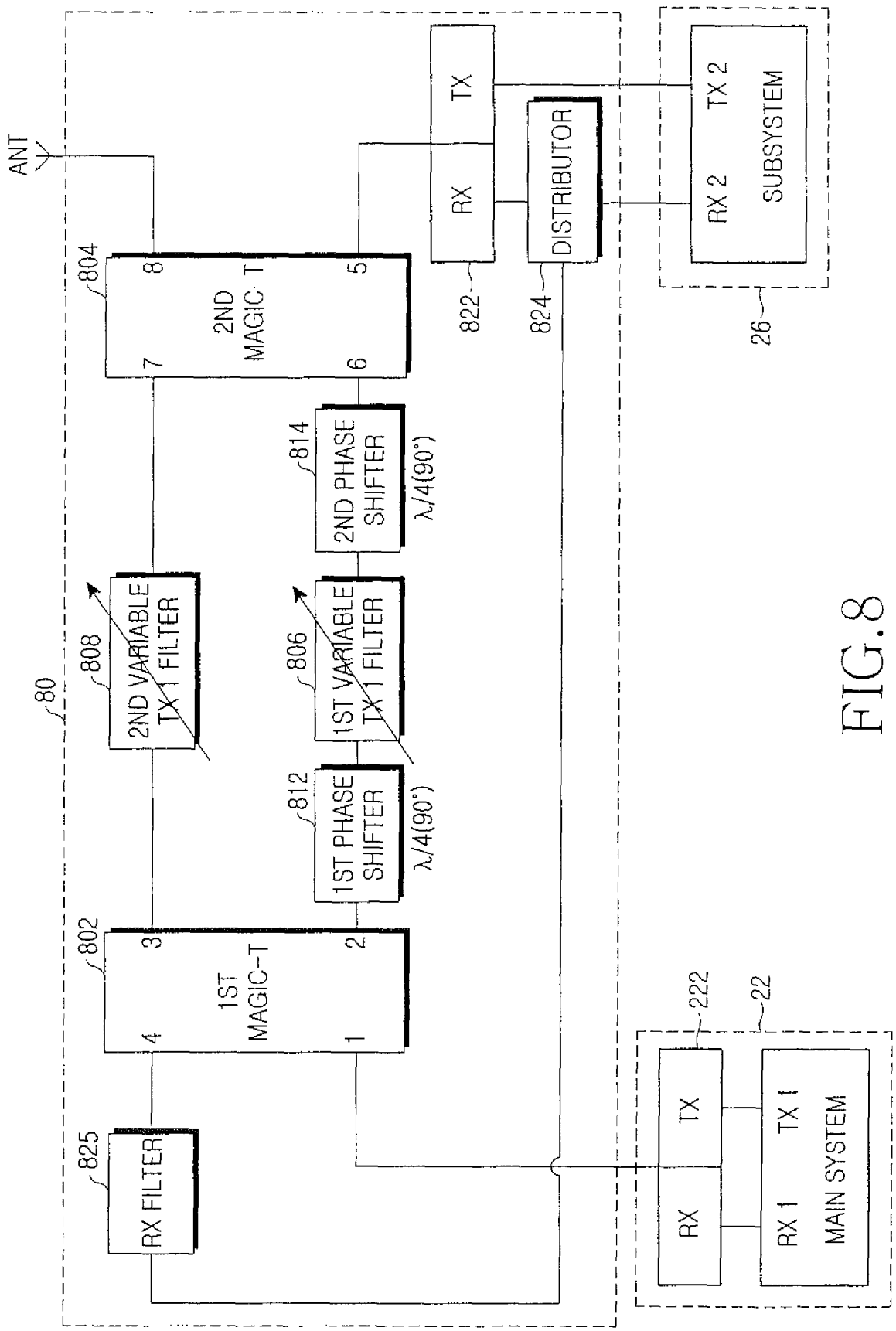
FIG. 8 is a block diagram of a wireless communication BS sharing apparatus according to a fourth embodiment of the present invention.

FIG. 8 is a block diagram of a wireless communication BS sharing apparatus according to a fourth embodiment of the present invention. Referring to FIG. 8, a wireless communication BS sharing apparatus 80 is so configured as to share an antenna between the main system 22 with the third duplexer 222 and the subsystem 26. The BS sharing apparatus 80 includes the main system with the third duplexer, the subsystem, a first magic T 802 for distributing a transmission signal received from the third duplexer 222 through a first port to second and third ports, with different phases and distributing a signal received from the antenna through a fourth port to the second and third ports, with the same phase, a first phase rotator 812 for receiving the signal from the second port of the first magic T 802 and rotating the phase of the received signal, a first variable band-pass filter 806 for filtering the signal received from the first phase rotator 812, a second phase rotator 814 for rotating the signal received from the first variable band-pass filter 806, a second variable band-pass filter 808 for filtering the signal received from the third port of the first magic T 802, and a second magic T 804 for receiving the signals from the second phase rotator 814 and the second band-pass filter 808 through sixth and seventh ports, respectively and combining the signals, a fourth duplexer 822 connected between a fifth port of the second magic T 804 and the subsystem 26, a distributor 824 connected between a receiver Rx of the fourth duplexer 822 and the subsystem 26, for distributing a signal received from the receiver Rx of the fourth duplexer 822, and a reception filter 826 for filtering a distributed signal from the distributor 824 and applying the filtered signal to the fourth port of the first magic T 802.

The antenna is connected to an eighth port of the second magic T 804. The receivers Rx of the third and fourth duplexers 222 and 822, and the reception filter 826 can be implemented by reception filters that pass no reception frequencies of the main system 22 and the subsystem 26, or full-band filters that pass the reception frequency bands of the main system 22 and the subsystem 26 in a particular band (e.g. PCS band). The first and second variable band-pass filters 806 and 808 pass only the transmission frequency band of the main system 22. If the main system 22 is exchanged with the subsystem 26 in position, the first and second variable band-pass filters 806 and 808 may pass only the transmission and reception frequency bands of the subsystem 26. If a filter such as the fourth duplexer 822 already exists in the subsystem 26, the fourth duplexer 622 may not be provided.

The operations of the wireless communication BS sharing apparatus will be described below.

<Transmission in Main System>

The transmission signal TX1 from the main system 22 passes through the third duplexer 222 and is provided to the first port of the first magic T 802. The first magic T 802 distributes the received signal to the second and third ports, with a phase difference of 180 degrees. The signal from the third port is provided to the seventh port of the second magic T 804 through the second variable band-pass filter 808. The phase of the signal from the second port is rotated by 90 degrees in the first phase rotator 812. After passing through the first variable band-pass filter 806, the signal from the first phase rotator 812 is phase-rotated by 90 degrees in the second phase rotator 808 and then output to the sixth port of the second magic T 804. Hence, the signals received in the second magic T 804 through the sixth and seventh ports have the same phase. The second magic T 804 combines these signals and outputs the combined signal through the eighth port. The signal from the eighth port is radiated through the antenna.

<Reception in Main System>

The second magic T 804 receives a signal from the antenna through the eighth port and distributes the signal to the sixth and seventh ports, with the same phase. The signal from the seventh port is fully reflected from the second variable band-pass filter 808 and fed back to the seventh port. The signal from the sixth port of the second magic T 804 is phase-rotated by 90 degrees in the second phase rotator 814, reflected from the first variable band-pass filter 806, phase-rotated again by 90 degrees in the second phase rotator 814, and then provided to the sixth port of the second magic T 804. Thus, the second magic T 804 receives the signals with a phase difference of 180 degrees through the sixth and seventh ports, combines them, and outputs the combined signal through the fifth port. The signal from the fifth port passes through the fourth duplexer 822 and is distributed as two signals in the distributor 824. One of the distributed signals is provided to the subsystem 26 and the other is provided to the fourth port of the first magic T 802 through the reception filter 826. The first magic T 802 distributes the signal received through the fourth port to the second and third ports, with the same phase. The signal from the third port is fully reflected from the second variable band-pass filter 808 and fed back to the third port. Although the signal from the second port is phase-rotated by 90 degrees in the first phase rotator 812, it is also reflected from the first variable band-pass filter 806, phase-rotated again by 90 degrees in the first phase rotator 812, and then provided to the second port of the first magic T 802. Thus, the first magic T 802 receives the signals with a phase difference of 180 degrees through the second and third ports, combines them, and outputs the combined signal through the first port. The signal from the first port passes through the third duplexer 222 and is provided to the receiver of the main system 22 through the third duplexer 222.

<Transmission in Subsystem>

The transmission signal TX2 from the subsystem 26 passes through the fourth duplexer 822 and is provided to the fifth port of the second magic T 804. The second magic T 804 distributes the received signal to the sixth and seventh ports, with a phase difference of 180 degrees. The signal from the seventh port is fully reflected from the second variable band-pass filter 808 and fed back to the seventh port. While the signal from the sixth port is phase-rotated by 90 degrees in the second phase rotator 814, it is also fully reflected from the first variable band-pass filter 806, again phase-rotated by 90 degrees in the second phase rotator 814, and fed back to the sixth port. Thus, the second magic T 804 receives the signals with the same phase through the sixth and seventh ports, combines them, and outputs the combined signal through the eighth port. This signal from the eighth port is radiated through the antenna.

<Reception in Subsystem>

The second magic T 804 receives a signal from the antenna through the eighth port and distributes the received signal to the sixth and seventh ports, with the same phase. The signal from the seventh port is fully reflected from the second variable band-pass filter 808 and fed back to the seventh port. While the signal from the sixth port is phase-rotated by 90 degrees in the second phase rotator 814, it is also fully reflected from the first variable band-pass filter 806, again phase-rotated by 90 degrees in the second phase rotator 814, and fed back to the sixth port. Thus, the second magic T 804 receives the signals with a phase difference of 180 degrees through the sixth and seventh ports, combines them, and outputs the combined signal through the fifth port. This signal from the fifth port is provided to the distributor 824 through the fourth duplexer 822. The distributor 824 distributes the received signal and outputs one of two distributed signals to the receiver of the subsystem 26.

Figure 9:
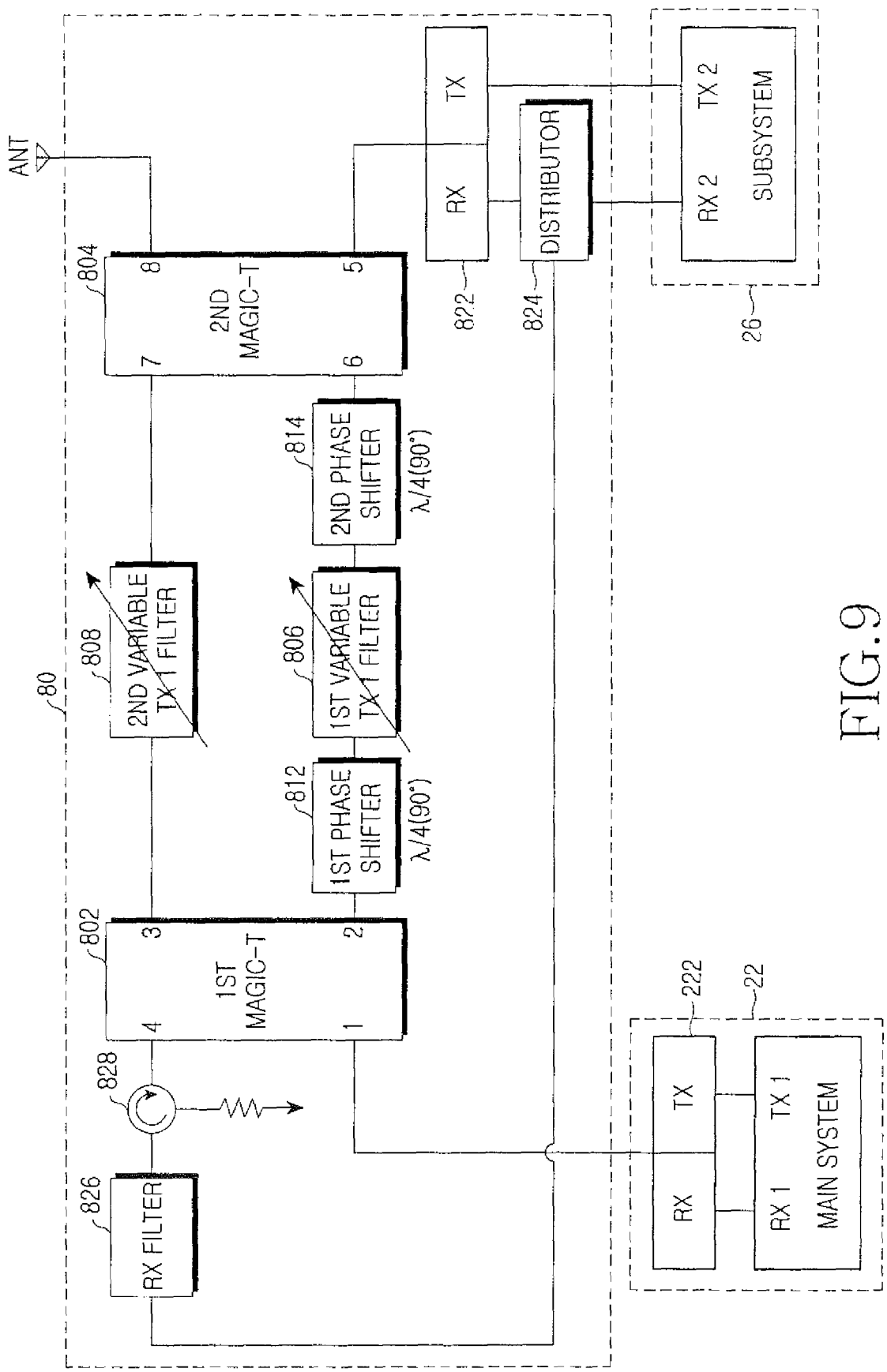
FIG. 9 is a block diagram of the wireless communication BS sharing apparatus illustrated in FIG. 8 to which a circulator is added.

Meanwhile, no reflection occurs theoretically during outputting the transmission signal Tx1 from the main system 22 through the first magic T 802. In practice, however some of the transmission signal Tx1 is output through the fourth port, although it is slight. To prevent this problem, a circulator 828 can be further provided between the reception filter 826 and the fourth port of the first magic T 802, for isolation, as illustrated in FIG. 9.

The use of the first and second variable band-pass filters 806 and 808, instead of frequency band-fixed filters, enables addition of a subsystem to a main system through frequency band division.

Figure 10:
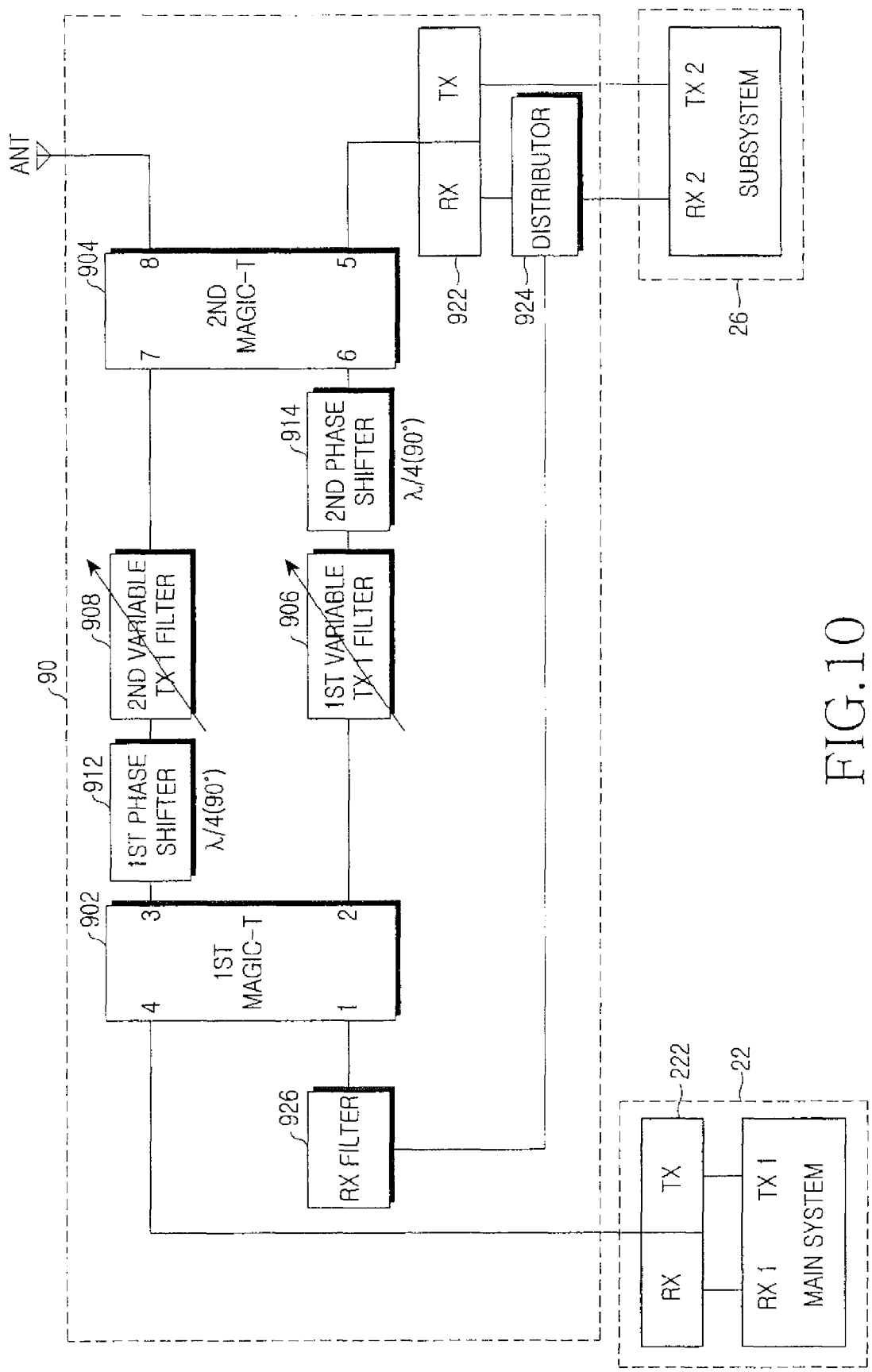
FIG. 10 is a block diagram of a wireless communication BS sharing, apparatus according to a fifth embodiment of the present invention.

FIG. 10 is a block diagram of a wireless communication BS sharing apparatus according to a fifth embodiment of the present invention. Referring to FIG. 10, a wireless communication BS sharing apparatus 90 is so configured as to share an antenna between the main system 22 with the third duplexer 222 and the subsystem 26. The BS sharing apparatus 90 includes a first magic T 902 for distributing a transmission signal received from the third duplexer 222 through a fourth port to third and fourth ports, with the same phase and distributing a signal received through a first port with different phases, a first phase rotator 912 for receiving the signal from the third port of the first magic T 902 and rotating the phase of the received signal, a second variable band-pass filter 908 for filtering the signal received from the first phase rotator 912, a first variable band-pass filter 906 for filtering the signal received from the second port of the first magic T, a second phase rotator 914 for rotating the signal received from the first variable band-pass filter 906, a second magic T 904 for receiving the signals from the second phase rotator 914 and the second variable band-pass filter 908 through sixth and seventh ports, respectively and combining the signals, a fourth duplexer 922 connected between a fifth port of the second magic T 904 and the subsystem 26, a distributor 924 connected between a receiver Rx of the fourth duplexer 922 and the subsystem 26, for distributing a signal received from the receiver Rx of the fourth duplexer 922, and a reception filter 926 for filtering a distributed signal received from the distributor 924 and applying the filtered signal to the first port of the first magic T 902.

The antenna is connected to an eighth port of the second magic T 904. The receivers Rx of the third and fourth duplexers 222 and 922, and the reception filter 926 can be implemented by reception filters that pass no reception frequencies of the main system 22 and the subsystem 26, or full-band filters that pass the reception frequency bands of the main system 22 and the subsystem 26 in a particular band (e.g. PCS band). The first and second variable band-pass filters 906 and 908 pass only the transmission frequency band of the main system 22. If the main system 22 is exchanged with the subsystem 26 in position, the first and second variable band-pass filters 906 and 908 may pass only the transmission and reception frequency bands of the subsystem 26. If a filter such as the fourth duplexer 922 already exists in the subsystem 26, the fourth duplexer 922 may not be provided.

The operations of the wireless communication BS sharing apparatus will be described below.

<Transmission in Main System>

The transmission signal TX1 from the main system 22 is provided to the fourth port of the first magic T 902 through the third duplexer 222. The first magic T 902 distributes the received signal to the second and third ports, with the same phase. The signal from the third port is phase-rotated by 90 degrees in the first phase rotator 912 and provided to the seventh port of the second magic T 904 through the second variable band-pass filter 908. After passing through the first variable band-pass filter 906, the signal from the second port is phase-rotated by 90 degrees in the second phase rotator 914 and then provided to the sixth port of the second magic T 904. Hence, the signals received in the second magic T 904 through the sixth and seventh ports have the same phase. The second magic T 904 combines these signals and outputs the combined signal through the eighth port. The signal from the eighth port is radiated through the antenna.

<Reception in Main System>

The second magic T 04 receives a signal from the antenna through the eighth port and distributes the signal to the sixth and seventh ports, with the same phase. The signal from the seventh port is fully reflected from the second variable band-pass filter 908 and fed back to the seventh port. The signal from the sixth port of the second magic T 904 is phase-rotated by 90 degrees in the second phase rotator 914, reflected from the first variable band-pass filter 906, phase-rotated again by 90 degrees in the second phase rotator 914, thus phase-rotated by 180 degrees in total and then provided to the sixth port of the second magic T 904. Thus, the second magic T 804 receives the signals with a phase difference of 180 degrees through the sixth and seventh ports, combines them, and outputs the combined signal through the fifth port. The signal from the fifth port passes through the fourth duplexer 922 and is distributed as two signals in the distributor 924. One of the distributed signals is provided to the subsystem 26 and the other is provided to the first port of the first magic T 902 through the reception filter 926. The first magic T 902 distributes the signal received through the first port to the second and third ports, with a phase difference of 180 degrees. The signal from the second port is fully reflected from the first variable band-pass filter 906 and fed back to the second port. Although the signal from the third port is phase-rotated by 90 degrees in the first phase rotator 912, it is also reflected from the first variable band-pass filter 906, phase-rotated again by 90 degrees in the first phase rotator 912, and then provided to the second port of the first magic T 802. Thus, the first magic T 902 receives the signals with the same phase through the second and third ports, combines them, and outputs the combined signal through the fourth port. The signal from the fourth port passes through the third duplexer 222 and is provided to the receiver of the main system 22 through the third duplexer 222.

<Transmission in Subsystem>

The transmission signal TX2 from the subsystem 26 passes through the fourth duplexer 922 and is provided to the fifth port of the second magic T 904. The second magic T 904 distributes the received signal to the sixth and seventh ports, with a phase difference of 180 degrees. The signal from the seventh port is fully reflected from the second variable band-pass filter 908 and fed back to the seventh port. While the signal from the sixth port is phase-rotated by 90 degrees in the second phase rotator 914, it is also fully reflected from the first variable band-pass filter 906, again phase-rotated by 90 degrees in the second phase rotator 914, and fed back to the sixth port. Thus, the second magic T 904 receives the signals with the same phase through the sixth and seventh ports, combines them, and outputs the combined signal through the eighth port. This signal from the eighth port is radiated through the antenna.

<Reception in Subsystem>

The second magic T 904 receives a signal from the antenna through the eighth port and distributes the received signal to the sixth and seventh ports, with the same phase. The signal from the seventh port is fully reflected from the second variable band-pass filter 908 and fed back to the seventh port. While the signal from the sixth port is phase-rotated by 90 degrees in the second phase rotator 914, it is also fully reflected from the first variable band-pass filter 906, again phase-rotated by 90 degrees in the second phase rotator 914, and fed back to the sixth port. Thus, the second magic T 904 receives the signals with a phase difference of 180 degrees through the sixth and seventh ports, combines them, and outputs the combined signal through the fifth port. This signal from the fifth port is provided to the distributor 924 through the fourth duplexer 922. The distributor 924 distributes the received signal and outputs one of two distributed signals to the receiver of the subsystem 26.

Figure 11:
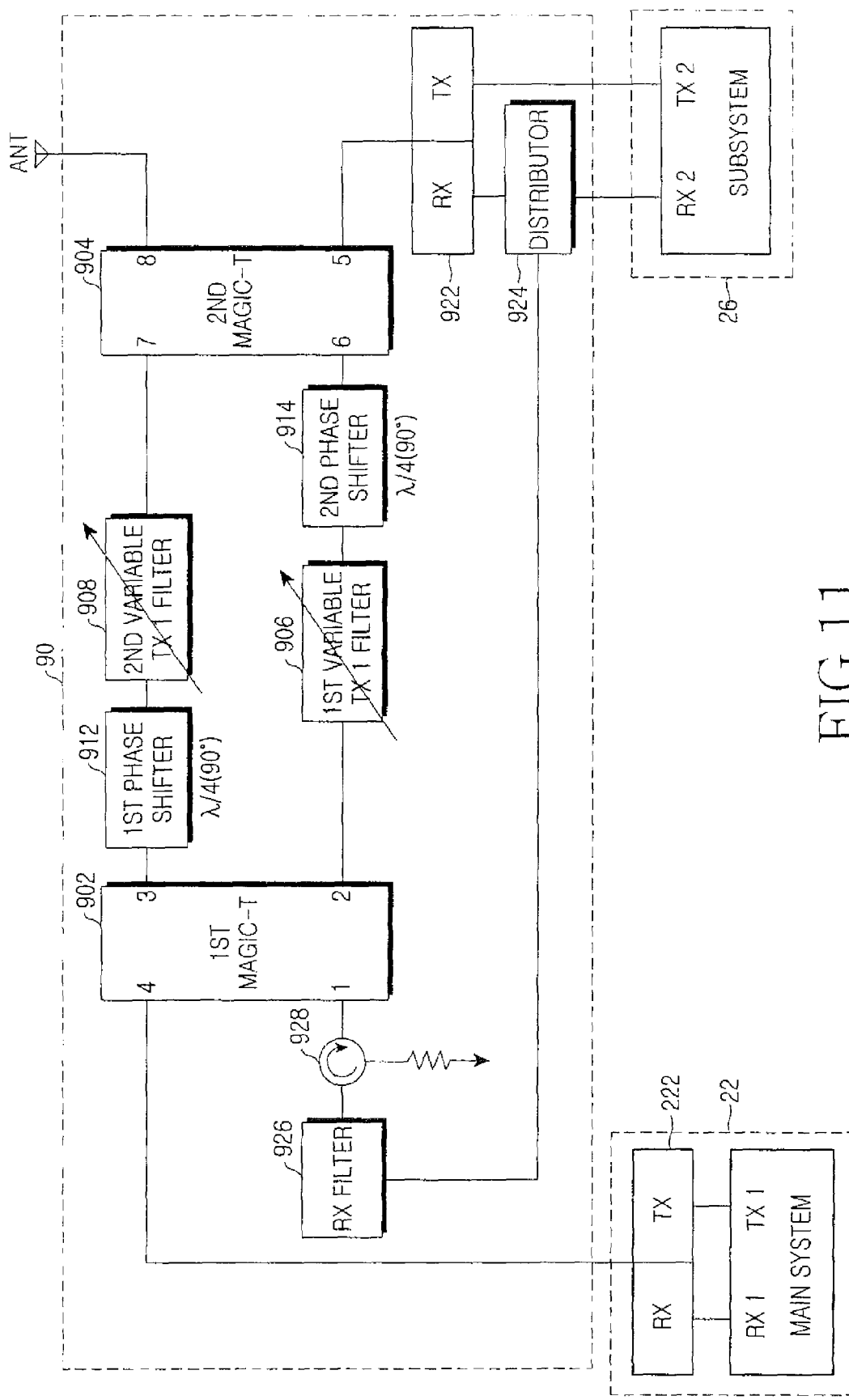
FIG. 11 is a block diagram of the wireless communication BS sharing apparatus illustrated in FIG. 10 to which a circulator is added.

Meanwhile, no reflection occurs theoretically during outputting the transmission signal Tx1 from the main system 22 through the first magic T 902. In practice, however, some of the transmission signal Tx1 is output through the fourth port, although it is slight. To prevent this problem, a circulator 928 can be further provided between the reception filter 926 and the fourth port of the first magic T 902, for isolation, as illustrated in FIG. 11.

The use of the first and second variable band-pass filters 906 and 908, instead of frequency band-fixed filters, enables addition of a subsystem to a main system through frequency band division.

Figure 13:
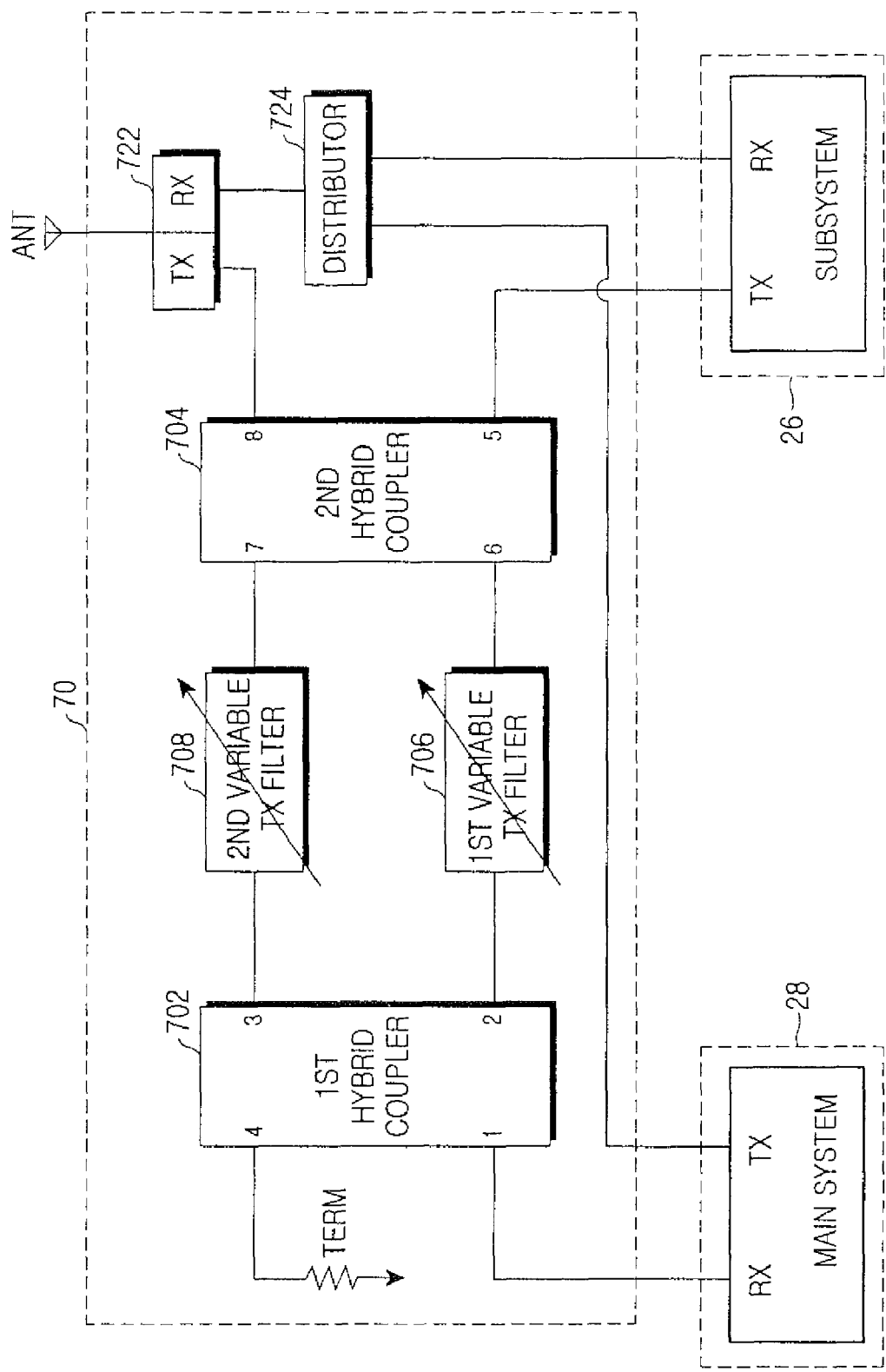
FIG. 13 is a block diagram of a wireless communication BS sharing apparatus according to a sixth embodiment of the present invention.

FIG. 13 is a block diagram of a wireless communication BS sharing apparatus according to a sixth embodiment of the present invention. The wireless communication BS sharing apparatus illustrated in FIG. 13 may not have a duplexer in either the main system 28 or the subsystem 26. Since the service frequency band of a BS system is separated and allocated to the main system 28 and the subsystem 26 according to the present invention, the basic service frequency band is identical to the main system 28 and the subsystem 26.

Referring to FIG. 13, a wireless communication BS sharing apparatus 70 is so configured as to share an antenna between the main system 28 and the subsystem 26.

This BS sharing apparatus 70 includes a first hybrid coupler 702 for distributing a transmission signal received from the main system 28 through a first port and outputting the distributed signals with different phases, a first variable band-pass filter 706 for filtering a signal received from a second port of the first hybrid coupler 702, a second variable band-pass filter 708 for filtering a signal received from a third port of the first hybrid coupler 702, a second hybrid coupler 704 for receiving signals from the first and second variable band-pass filters 706 and 708 through sixth and seventh ports, combining the signals, outputting the combined signal through an eighth port, and receiving a transmission signal from the subsystem 26 through a fifth port, a duplexer 722 whose transmitter Tx is connected to the eighth port of the second hybrid coupler 704, for transmitting the transmission signal from the transmitter Tx to an antenna, and a distributor 724 for distributing a signal received from a receiver Rx of the duplexer 722 to the main system 28 and the subsystem 26.

The operations of the wireless communication BS sharing apparatus will be described below.

<Transmission in Main System>

The first hybrid coupler 702 receives through the first port the transmission signal Tx from the main system 28 and distributes the received signal to the second and third ports, its phase being rotated by 90 degrees and 180 degrees, respectively for the second and third ports. Thus, the distributed signals have a phase difference of 90 degrees.

The signals from the second and third ports pass through the first and second variable band-pass filters 706 and 708 that pass only the transmission signal Tx of the main system 28 and are provided to the sixth and seventh ports of the second hybrid coupler 704.

The second hybrid coupler 704 combines the received signals and outputs the combined signal through the eighth port. This signal from the eighth port is radiated through the antenna.

<Reception in Main System>

A signal received through the antenna is filtered in the receiver Rx of the duplexer 722. The distributor 724 distributes the filtered signal. One of the distributed signals is provided to the subsystem 26 and the other is provided to the main system 28. Thus the signal is received at the main system 28.

<Transmission in Subsystem>

A transmission signal Tx from the subsystem 26 is provided to the second hybrid coupler 704 through the fifth port.

The second hybrid coupler 704 distributes the received signal to the sixth and seventh ports, its phase being rotated by 90 degrees and 180 degrees, respectively for the sixth and seventh ports. Thus, the distributed signals have a phase difference of 90 degrees.

The signals from the sixth and seventh ports are fully reflected from the first and second variable band-pass filters 706 and 708 and fed back to the sixth and seventh ports.

The feedback signals are combined and output through the eighth port. The signal from the eighth filter is radiated through the antenna after passing through the duplexer 722.

<Reception in Subsystem>

A signal received through the antenna is filtered in the receiver Rx of the duplexer 722. The distributor 724 distributes the filtered signal. One of the distributed signals is provided to the subsystem 26. Thus the signal is received at the subsystem 26.

While the invention has been shown and described with reference to certain preferred embodiments thereof, they are merely exemplary applications.

For example, while the first and second variable duplexers, and the first and second variable band-pass filters are used for variable filtering of the transmission and/or reception frequency band, they can be replaced with Low Pass Filters (LPFs) and/or High Pass Filters (HPFs), or their combinations.

While for the purpose of increasing filtering performance, the BS sharing apparatuses illustrated in FIGS. 6 to 11 are so configured that the distributors 624, 824, 924 are connected between the receivers Rx of the fourth duplexers 622, 822 and 922 and the subsystem 26, distribute a signal from the receivers Rx, and provide one of the distributed signals as a received signal for the main system 22, it can be further contemplated that one of the distributed signals is directly provided to the third duplexer 322 of the main system 22 without passing through the reception filters 626, 826 and 926.

Also, while the BS sharing apparatus illustrated in FIG. 13 adopts hybrid couplers, the hybrid couplers can be replaced with magic Ts as in the second embodiment.

Besides the above modifications, many other modifications in form and details may be made without departing from the spirit and scope of the invention as defined by the appended claims.

INDUSTRIAL APPLICABILITY

As described above, the wireless communication ES sharing apparatus according to the present invention enables a main BS system and a sub-BS system with a different frequency band added to the main BS system to easily share an antenna and a feeder cable.

Irrespective of the frequency band of the subsystem, the antenna and the feeder cable can be shared.

The wireless communication BS sharing system can be simply implemented even for a plurality of subsystems.

It can cope regardless of the frequency bands of the main system and the subsystem.

Also in the wireless communication BS sharing apparatus, a given frequency band is separated and allocated to different operation systems.

Particularly when a frequency-variable filter is used, one model is sufficient for a variety of frequency combinations. Thus, different models need not be developed.

In addition, products can be delivered in a short time, management cost is saved because many models need not be fabricated, and mass production is enabled, thereby reducing fabrication cost.

Since frequency band can be changed while the wireless communication BS sharing apparatus is operated, an immediate action can be taken against changes between service providers or local frequency changes. As compared to the conventional technology, uninstallation and reinstallation are not required, thereby saving cost.

What is claimed is:

1. A wireless communication base station sharing apparatus for sharing one antenna between a main base station system including a transceiver and a sub base station system including a transceiver using a frequency band different from another frequency band used in the main base station system, comprising:
a first signal combiner/distributor connected to a transmission/reception signal line of a main base station system, through a first port, for distributing a signal received through the first port to second and third ports, and combining signals received through the second and third ports according to the phases of the signals and outputting the combined signal through the first port or a fourth port;
a second signal combiner/distributor connected to a transmission/reception signal line of a sub base station system duplexer through a fifth port and connected to the antenna through an eighth port, for distributing a signal received through the fifth port to sixth and seventh ports, and combining signals received through the sixth and seventh ports according to the phases of the signals and outputting the combined signal through the fifth port or eighth port;
a first variable filter provided in a signal path between the second port of the first signal combiner/distributor and the sixth port of the second signal combiner/distributor, for filtering a predetermined frequency band and variably shifting a filtering band according to an external control signal; and
a second variable filter provided in a signal path between the third port of the first signal combiner/distributor and the seventh port of the second signal combiner/distributor, for filtering
a predetermined frequency band and variably shifting a filtering band according to an external control signal,
wherein the first and second signal combiners/distributors are hybrid couplers and the first and second variable filters are band-pass filters for passing the transmission and reception frequency bands of the main base station system, further comprising a distributor for distributing a signal received from a receiver of the sub base station system duplexer, and a reception filter for filtering a distributed signal received from the distributor and providing the filtered signal to the fourth port of the first signal combiner/distributor.

2. A wireless communication base station sharing apparatus for sharing one antenna between a main base station system including a transceiver and a sub base station system including a transceiver using a frequency band different from another frequency band used in the main base station system, comprising:
a first signal combiner/distributor connected to a transmission/reception signal line of a main base station system through a first port, for distributing a signal received through the first port to second and third ports, and combining signals received through the second and third ports according to the phases of the signals and outputting the combined signal through the first port or a fourth port;
a second signal combiner/distributor connected to a transmission/reception signal line of a sub base station system duplexer through a fifth port and connected to the antenna through an eighth port, for distributing a signal received through the fifth port to sixth and seventh ports, and combining signals received through the sixth and seventh ports according to the phases of the signals and outputting the combined signal through the fifth port or eighth port;
a first variable filter provided in a signal path between the second port of the first signal combiner/distributor and the sixth port of the second signal combiner/distributor, for filtering a predetermined frequency band and variably shifting a filtering band according to an external control signal; and
a second variable filter provided in a signal path between the third port of the first signal combiner/distributor and the seventh port of the second signal combiner/distributor, for filtering a predetermined frequency band and variably shifting a filtering band according to an external control signal,
wherein the first and second signal combiners/distributors are magic Ts and the first and second variable filters are band-pass filters for passing the transmission and reception frequency bands of the main base station system, further comprising a first phase rotator provided in a signal path between the first variable filter and the second port of the first signal combiner/distributor, a second phase rotator provided in a signal path between the first variable filter and the sixth port of the second signal combiner/distributor, a distributor for distributing a signal received from the receiver of the sub base station system duplexer, and a reception filter for filtering a distributed signal received from the distributor and providing the filtered signal to the fourth port of the first signal combiner/distributor.

3. The wireless communication base station sharing apparatus of claim 1 or claim 2, further comprising a circulator having an isolation function in a signal path between the reception filter and the fourth port of the first signal combiner/distributor.

4. A wireless communication base station sharing apparatus for sharing one antenna between a main base station system including a transceiver and a sub base station system including a transceiver using a frequency band different from another frequency band used in the main base station system, comprising:
- a first signal combiner/distributor connected to a transmission/reception signal line of a main base station system through a first port, for distributing a signal received through the first port to second and third ports, and combining signals received through the second and third ports according to the phases of the signals and outputting the combined signal through the first port or a fourth port;
- a second signal combiner/distributor connected to a transmission/reception signal line of a sub base station system duplexer through a fifth port and connected to the antenna through an eighth port, for distributing a signal received through the fifth port to sixth and seventh ports, and combining signals received through the sixth and seventh ports according to the phases of the signals and outputting the combined signal through the fifth port or eighth port;
- a first variable filter provided in a signal path between the second port of the first signal combiner/distributor and the sixth port of the second signal combiner/distributor, for filtering a predetermined frequency band and variably shifting a filtering band according to an external control signal; and
- a second variable filter provided in a signal path between the third port of the first signal combiner/distributor and the seventh port of the second signal combiner/distributor, for filtering a predetermined frequency band and variably shifting a filtering band according to an external control signal
wherein the first and second signal combiners/distributors are hybrid couplers and the first and second variable filters are band-pass filters for passing the transmission and reception frequency bands of the main base station system, further comprising a distributor or distributing a signal received from the receiver of the sub base station system duplexer and providing one of the distributed signals to the fourth port of the first signal combiner/distributor.

5. A wireless communication base station sharing apparatus for sharing one antenna between a main base station system including a transceiver and a sub base station system including a transceiver using a frequency band different from another frequency band used in the main base station system, comprising:
- a first signal combiner/distributor connected to a transmission/reception signal line of a main base station system through a first port, for distributing a signal received through the first port to second and third ports, and combining signals received through the second and third ports according to the phases of the signals and outputting the combined signal through the first port or a fourth port;
- a second signal combiner/distributor connected to a transmission/reception signal line of a sub base station system duplexer through a fifth port and connected to the antenna through an eighth port, for distributing a signal received through the fifth port to sixth and seventh ports, and combining signals received through the sixth and seventh ports according to the phases of the signals and outputting the combined signal through the fifth port or eighth port;
- a first variable filter provided in a signal path between the second port of the first signal combiner/distributor and the sixth port of the second signal combiner/distributor, for filtering a predetermined frequency band and variably shifting a filtering band according to an external control signal; and
- a second variable filter provided in a signal path between the third port of the first signal combiner/distributor and the seventh port of the second signal combiner/distributor, for filtering a predetermined frequency band and variably shifting a filtering band according to an external control signal,
wherein the first and second signal combiners/distributors are magic Ts and the first and second variable filters are band-pass filters for passing only the transmission frequency band of the main base station system, further comprising a first phase rotator provided in a signal path between the first variable filter and the second port of the first signal combiner/distributor, a second phase rotator provided in a signal path between the first variable filter and the sixth port of the second signal combiner/distributor, and a distributor or distributing a signal received from the receiver of the sub base station system duplexer and providing one of the distributed signals to the fourth port of the first signal combiner/distributor.

6. A wireless communication base station sharing apparatus for sharing one antenna between a main base station system including a transceiver and a sub base station system including a transceiver using a frequency band different from another frequency band used in the main base station system, comprising:
- a first signal combiner/distributor connected to a transmission/reception signal line of a main base station system through a first port, for distributing a signal received through the first port to second and third ports, and combining signals received through the second and third ports according to the phases of the signals and outputting the combined signal through the first port or a fourth port;
- a second signal combiner/distributor connected to a transmission/reception signal line of a sub base station system duplexer through a fifth port and connected to the antenna through an eighth port, for distributing a signal received through the fifth port to sixth and seventh ports, and
combining signals received through the sixth and seventh ports according to the phases of the signals and outputting the combined signal through the fifth port or eighth port;

a first variable filter provided in a signal path between the second port of the first signal combiner/distributor and the sixth port of the second signal combiner/distributor, for filtering a predetermined frequency band and variably shifting a filtering band according to an external control signal; and a second variable filter provided in a signal path between the third port of the first signal combiner/distributor and the seventh port of the second signal combiner/distributor, for filtering a predetermined frequency band and variably shifting a filtering band according to an external control signal wherein the first and second signal combiners/distributors are magic Ts and the first and second variable filters are band-pass filters for passing the transmission and reception frequency bands of the main base station system, further comprising a first phase rotator provided in a signal path between the second variable filter and the third port of the first signal combiner/distributor, a second phase rotator provided in a signal path between the first variable filter and the sixth port of the second signal combiner/distributor, a distributor for distributing a signal received from the receiver of the sub base station system duplexer, and a reception filter for filtering a distributed signal received from the distributor and providing the filtered signal to the fourth port of the first signal combiner/distributor.

7. The wireless communication base station sharing apparatus of claim 6, further comprising a circulator having an isolation function in a signal path between the reception filter and the fourth port of the first signal combiner/distributor.

8. A wireless communication base station sharing apparatus for sharing one antenna between a main base station system and a sub base station system, comprising:

a first magic T connected to a transmission/reception signal line of a main base station system duplexer through a fourth port, for distributing a signal received through the fourth port and outputting the distributed signals with the same phase to second and third ports, and combining signals received through the second and third ports according to the phases of the signals and outputting the combined signal through a first port or the fourth port;

a second magic T connected to a transmission/reception signal line of a sub base station system duplexer through a fifth port and connected to the antenna through an eighth port, for distributing a signal received through the fifth port and outputting the distributed signals with the same phase to sixth and seventh ports, and combining signals received through the sixth and seventh ports according to the phases of the signals and outputting the combined signal through the fifth or eighth port;

a first variable band-pass filter provided in a signal path between the second port of the first magic T and the sixth port of the second magic T, for passing the transmission frequency band of the main base station system and variably shifting a filtering band according to an external control signal;

a second variable band-pass filter provided in a signal path between the third port of the first magic T and the seventh port of the second magic T, for passing the transmission frequency band of the main base station system and variably shifting a filtering band according to an external control signal; a first phase rotator provided in a signal path between the second variable band-pass filter and the third port of the first magic T;

a second phase rotator provided in a signal path between the first variable band-pass filter and the sixth port of the second magic T;

a distributor for distributing a signal received from a receiver of the sub base station system duplexer;

a reception filter for filtering a distributed signal received from the distributor; and a circulator for providing the filtered signal received from the reception filter to the first port of the first magic T.

9. A wireless communication base station sharing apparatus for sharing one antenna between a main base station system including a transceiver and a sub base station system including a transceiver using a frequency band different from another frequency band used in the main base station system, comprising:

a first signal combiner/distributor connected to a transmission signal line of a main base station system through a first port, for distributing a signal received through the first port to second and third ports, and combining signals received through the second and third ports according to the phases of the signals and outputting the combined signal through the first port or a fourth port;

a second signal combiner/distributor connected to a transmission signal line of a sub base station system through a fifth port, for distributing a signal received through the fifth port to sixth and seventh ports, and combining signals received through the sixth and seventh ports according to the phases of the signals and outputting the combined signal through the fifth port or eighth port; a first variable filter provided in a signal path between the second port of the first signal combiner/distributor and the sixth port of the second signal combiner/distributor, for filtering a predetermined frequency band and variably shifting a filtering band according to an external control signal;

a second variable filter provided in a signal path between the third port of the first signal combiner/distributor and the seventh port of the second signal combiner/distributor, for filtering a predetermined frequency band and variably shifting a filtering band according to an external control signal;

a duplexer having a transmitter connected to the eighth port of the second signal combiner/distributor, for providing a transmission signal from the transmitter to an antenna; and a distributor for distributing a signal received from a receiver of the duplexer to the main base station system and the sub base station system.

10. The wireless communication base station sharing apparatus of claim 9, wherein the first and second signal combiners/distributors are hybrid couplers.

11. The wireless communication base station sharing apparatus of claim 9, wherein the first and second signal combiners/distributors are magic Ts, further comprising a first phase rotator provided in a signal path between the first variable filter and the second port of the first signal combiner/distributor, and a second phase rotator provided in a signal path between the first variable filter and the sixth port of the second signal combiner/distributor.

* * * * *